Feb. 2, 1971 V. A. ILIN ET AL 3,560,877

TRANSISTORIZED BLOCKING OSCILLATOR WITH BRIDGE
RC TIME SETTING CIRCUITS
Filed Sept. 23, 1968

United States Patent Office 3,560,877

Patented Feb. 2, 1971

3,560,877

TRANSISTORIZED BLOCKING OSCILLATOR WITH BRIDGE RC TIME SETTING CIRCUITS

Viktor Alexandrovich Ilin, Ulitsa Gorkogo 6, korpus 5, kv. 330; Vladimir Alexandrovich Shpolyansky, Ulitsa Lizy chaikinoi 6, kv. 113; and Boris Nicolaevich Konshin, Volzhsky bulvar 46, korpus 1, kv. 23, all of Moscow, U.S.S.R.

Filed Sept. 23, 1968, Ser. No. 761,619

Int. Cl. H03k *3/30*

U.S. Cl. 331—110 4 Claims

ABSTRACT OF THE DISCLOSURE

A blocking oscillator is provided with a transformer having a primary and secondary winding, a transistor having a base, emitter and collector, a frequency-dependent bridge having a first and a second branch, and first and second diodes. The first branch includes a capacitor and a resistor, and the second branch includes two resistors. The primary winding of the transformer is connected to the base and emitter of the transistor. The secondary winding of the transformer is connected at one end to the collector of the transistor, the first diode and the first branch of the frequency-dependent bridge, and is connected at its other end to the collector of the transistor, the second diode and the second branch of the frequency-dependent bridge. A power source is also coupled with the second branch.

The present invention relates to pulse oscillators, and more particularly to blocking oscillators.

Known are blocking oscillators comprising a pulse transformer and a time-setting RC network, both being connected to a transistor.

A disadvantage of such blocking oscillators is that, with variations in temperature or supply voltage the frequency stability thereof is reduced and because of that they are only used as pulse shapers.

The present invention aims at the elimination of the above-mentioned disadvantage.

The main object of the invention is to provide a blocking oscillator which, with variations in temperature or supply voltage provides for a sufficient frequency stability such that it can be used as a standard-frequency source or a pulse time-delay element.

The object of the invention is accomplished by a blocking oscillator comprising a pulse transformer and a time-setting RC network, both being connected to a transistor, in which, according to the invention, the time-setting RC network components are arranged into a frequency-dependent bridge to a diagonal of which one of the pulse transformer windings is connected, through a switch as a sensitive null detector.

In such a blocking oscillator, the frequency-dependent bridge may have each branch thereof constituted by at least one resistor and one capacitor.

For better frequency stability, one branch of the frequency-dependent bridge is preferably constituted of at least one resistor and one capacitor, while the second branch of this bridge consists of at least two resistors.

It is also preferable that the resistor in one of the branches of the frequency-dependent bridge be shunted by an additional RC network, the capacitor of which is charged by a power source through a series combination of a resistor and a switch controlled by a trigger.

Owing to high frequency stability and simple circuitry, the blocking oscillator disclosed herein can be widely used in pulse circuits as a stabilized pulse oscillator, a timing or sequential pulse oscillator, or a pulse time-delay device.

The blocking oscillator disclosed herein would be especially effective in the v.l.f. and l.f. bands where provision of a stable frequency or stable pulse delays entails considerable technical handicaps and capital expenditure.

The frequency stability of the blocking oscillator disclosed herein is at least $3\times10^{-4}$ units per 1° centigrade in the frequency band from 20 to 50 c./s., and in the frequency band from 300 to 500 c./s. This figure is not less than $5\times10^{-5}$, though no component adjustment is made or a temperature compensation means is used.

The invention will be best understood from the following description of a preferred embodiment thereof when read in connection with the accompanying drawings in which.

Figure 1:
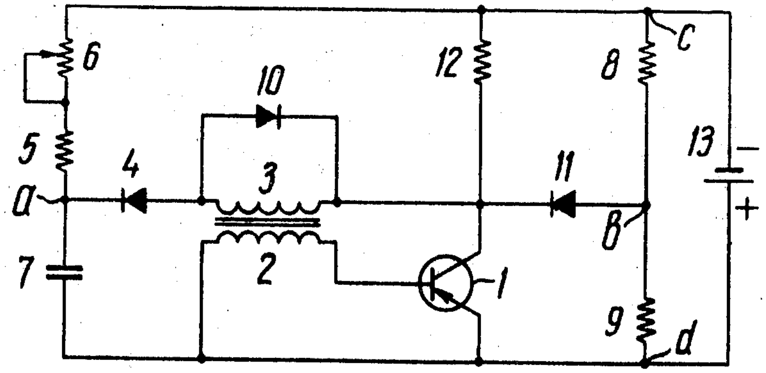
FIG. 1 is a schematic circuit diagram of a blocking oscillator with asymmetrical time-setting RC networks.

Referring more particularly to FIG. 1, a blocking oscillator contains a transistor 1 connected in a common-emitter circuit. Connected to the input circuit of the transistor 1 is a base winding 2 of a pulse transformer. One end of a second pulse transformer winding 3 is connected, through a diode 4, at a point *a* between a capacitor 7 and a series combination of a fixed resistor 5 and a variable resistor 6, constituting a first branch of a frequency-dependent bridge. The other end of the winding 3 is connected at a point *b* to a second branch of the frequency-dependent bridge, which branch is constituted by resistors 8 and 9. Thus, the winding 3 is connected, through the diode 4, to the diagonal of the frequency-dependent bridge between junctions *a* and *b* thereof.

A diode 10 prevents the reverse current from passing into the winding 3.

Since, in such a blocking oscillator, the time-setting networks, the first of which consists of resistors 5 and 6, and a capacitor 7 and the second of which consists of resistors 8 and 9, are asymmetrical, means are provided for reducing the effect of the thermal current across the transistor 1, the collector of this being connected to the pulse transformer winding 3, for frequency stability. These means are a network comprising a diode 11, connected between the collector of the transistor 1 and the junction *b* of the frequency-dependent bridge, and a current-limiting resistor 12.

The power source 13 is connected to the bridge diagonal defined by the junctions *c* and *d*.

Figure 2:
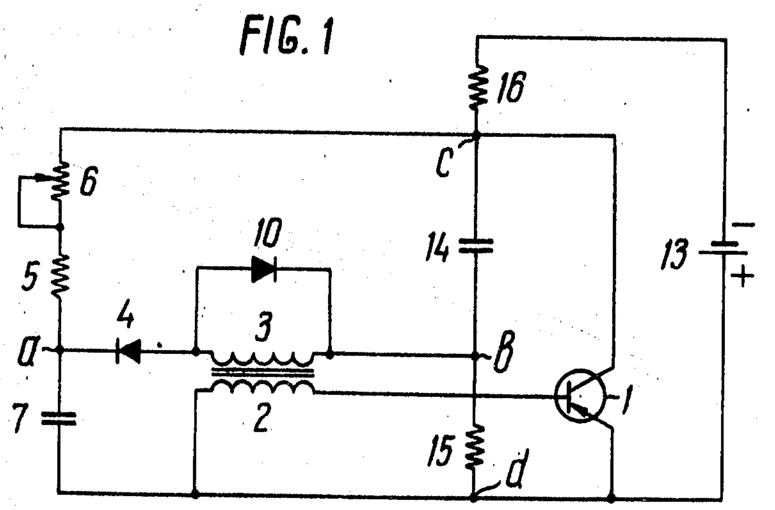
FIG. 2 is a schematic circuit diagram of a blocking oscillator with symmetrical time-setting RC networks.

In the blocking oscillator of FIG. 2, the bridge branch which has its junction *b* connected to the pulse transformer winding 3 is constituted by a capacitor 14 and a resistor 15, while the diagonal defined by the junctions *c* and *d* contains connected in parallel the output of the transistor 1 with a series combination of the power source 13 and a resistor 16.

Figure 3:
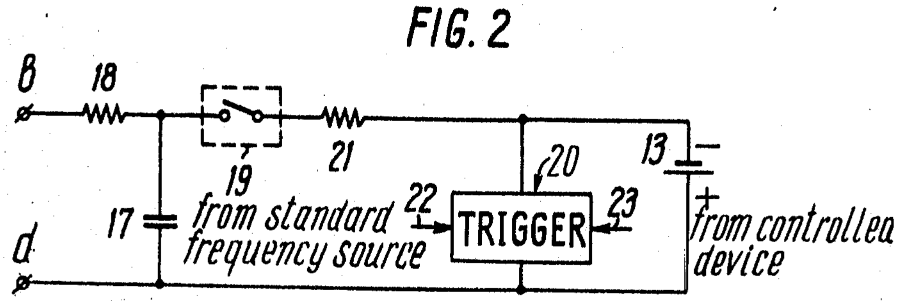
FIG. 3 is a schematic circuit diagram of an A.F.C. circuit for the blocking oscillator of FIG. 2.

When the blocking oscillator disclosed herein is used as a standard-frequency source, for controlling a device (not shown) which may be subject to a cumulative time error, provision will be made, to eliminate such error, for a device which automatically corrects the frequency of the blocking oscillator at regular intervals of time. This device contains an additional RC network constituted of a capacitor 17 (FIG. 3) and a resistor 18. The capacitor 17 is charged by the power source 13 through a switch 19, controlled by a trigger 20, and a resistor 21. The input 22 of the trigger 20 is connected to a standard-frequency source (not shown) while the input 23 is connected to the output of the controlled device for example, a clock.

The additional RC network is connected to the junctions *b* and *d* of the frequency-dependent bridge.

The blocking oscillator disclosed herein operates as follows.

Between two consecutive pulses to be formed, the capacitor 7 tends to become charged by the voltage of the power source 13 with a charge time constant determined by the resistors 5 and 6, the diode 4 being open.

When the voltage on the capacitor 7 becomes approximately equal to the potential at the junction *b*, i.e. when the junctions *a* and *b* of the frequency-dependent bridge are of equal potential, the diode 4 closes and a transient current begins to flow through the pulse transformer winding 3, which brings the transistor 1 into an active (regeneration) region.

The instant when the diode 4 closes, i.e. the interval between any two consecutive pulses to be formed, is determined by the charge time constant of the capacitor 7, which is, in turn, determined by the resistors 5 and 6 and the capacitor 7. The potential at the junction *b*, which can be adjusted by a voltage divider constituted of the resistors 8 and 9, also governs the interval between any two consecutive pulses to be formed.

Since the regeneration process is of short duration, the voltage on the capacitor 7 remains practically unchanged. By the time the regeneration process has been completed, the transistor 1 becomes fully conductive and a relaxation process follows during which the top of the pulse is formed.

Now, the capacitor 7 discharges through the pulse transformer winding 3 and the conducting transistor 1. The shaping of the pulse top is completed by the time the capacitor 7 has been discharged to a zero voltage.

In the blocking oscillator of FIG. 2, the capacitors 7 and 14 are charged, between any two consecutive pulses, through the resistors 5 and 6 and the resistor 15, respectively. In this case, the instant when the diode 4 closes, i.e. the interval between any two consecutive pulses, is determined by the charge time constants of the capacitors 7 and 14 in the bridge branches, of which one consists of the resistors 5 and 6 and the capacitor 7, while the other consists of the capacitor 14 and the resistor 15.

Upon closure of the diode 4, the regeneration process begins when the junctions *a* and *b* of the bridge diagonal are of equal potential. From that instant on, the circuit operates as already described.

Thus, the interval between any two consecutive pulses is independent of the charge or discharge current through the P-N junctions of the transistor 1, while the leakage resistance, the non-linear resistances of the P-N junctions and the thermal currents of the transistor 1 have no effect on the stability of the resulting time interval between two consecutive pulses, because the transistor 1 is connected to a diagonal of the frequency-dependent bridge.

With the parameters of the blocking oscillator properly selected, the frequency stability will depend solely on the stability of the elements of the frequency-dependent bridge, this stability being at a maximum in the bridge with symmetrical arms (FIG. 2).

The time interval during which the switch 19, controlled by the trigger 20, remains closed and the capacitor 17 is being charged by the power source 13 through the resistor 21, is proportional to the difference between the standard frequency applied to the input 22 of the trigger 20 and the frequency applied to the input 23 of the trigger 20 from the controlled device, for example a clock. For normal operation of the device which automatically corrects the frequency of the blocking oscillator, it is essential that the repetition frequency of the pulses coming to the input 23 of the trigger 20 from the controlled device be always somewhat higher than the standard frequency, i.e. the frequency of the blocking oscillator be somewhat higher than the nominal frequency at which the error of the controlled circuit is at a minimum. Such a frequency setting of the blocking oscillator is obtained by the variable resistor 6.

Thus, the voltage on the capacitor 17 is proportional to the difference between the frequencies at the inputs 22 and 23 of the trigger 20. As a result, the diode 4 will open between two consecutive pulses a short time after the junctions *a* and *b* have come up to an equal potential, since this result is promoted by the voltage on the capacitor 17.

Since it usually takes for the blocking oscillator several cycles to eliminate the cumulative error of the controlled device, the discharge time constant of the capacitor 17 is chosen to be somewhat larger than the period of oscillation of the blocking oscillator.

When using the blocking oscillator disclosed herein as a pulse time-delay element, there is no need for the power source 13, and the bridge diagonal defined by the junctions *c* and *d* to be connected to the output of an associated pulse-shaping circuit (not shown). In this case, the voltage pulse appearing on the collector of the transistor 1 will be delayed, relative to an input pulse, by a time interval *t* determined by the parameters of the frequency-dependent bridge of the blocking oscillator.

Although the invention has been disclosed in connection with a preferred embodiment thereof, various modifications are contemplated and may obviously be resorted to by those skilled in the art without departing from the spirit and scope of the invention as hereinafter defined by the appended claims.

What is claimed is:

1. A blocking oscillator comprising in combination a transformer including a primary and secondary winding, a transistor including a base, and emitter and collector electrodes, a power source, said primary winding being connected to said base and emitter electrodes, a frequency-dependent bridge including a first branch and a second branch, a first diode, and a second diode, said secondary winding having opposite ends, one end of said opposite ends being connected to said collector electrode and through said first diode to said first branch of said frequency-dependent bridge and the other end of said opposite ends to said collector electrode and through said connected to said base and emitter electrodes, a frequency dependent bridge, said first branch including a capacitor and a resistor, said second branch including two resistors, said power source being connected to said first and second branches of said frequency-dependent bridge and to said collector and emitter electrodes.

2. A blocking oscillator comprising in combination a transformer including a primary and secondary winding, a transistor including a base, and emitter and collector electrodes, a power source, said primary winding being connected to said base and emitter electrodes, a frequency-dependent bridge including a first branch and a second branch, first and second diodes, said secondary winding having opposite ends, one end of said opposite ends being connected through said first diode to said first branch of said frequency-dependent bridge and the other end of said opposite ends to said second branch of said frequency-dependent bridge, said first branch and said second branch each including a capacitor and resistor, a further resistor connecting said power source to said first and second branches of said frequency-dependent bridge and to said collector and emitter electrodes.

3. A blocking oscillator as claimed in claim 1 including an additional resistor and capacitor electrically coupled to one another and to one of said branches for shunting the resistor in said one of said branches, and further including a series coupled switch and resistor, and a control trigger coupled with said series coupled switch and resistor and said power source.

4. A blocking oscillator as claimed in claim 2 including an additional resistor and capacitor electrically coupled to one another and to one of said branches for shunting the resistor in said one of said branches, and further including a series coupled switch and resistor, and a control trigger coupled with said series coupled switch and resistor and said power source.

References Cited

UNITED STATES PATENTS 3,010,032 11/1961 Carney ---------- 331—112X

OTHER REFERENCES

Taylor, Radio-Electronics, January 1961, p. 38.

JOHN KOMINSKI, Primary Examiner

S. H. GRIMM, Assistant Examiner

U.S. Cl. X.R.

331—112, 149, 175